UNITED STATES PATENT OFFICE.

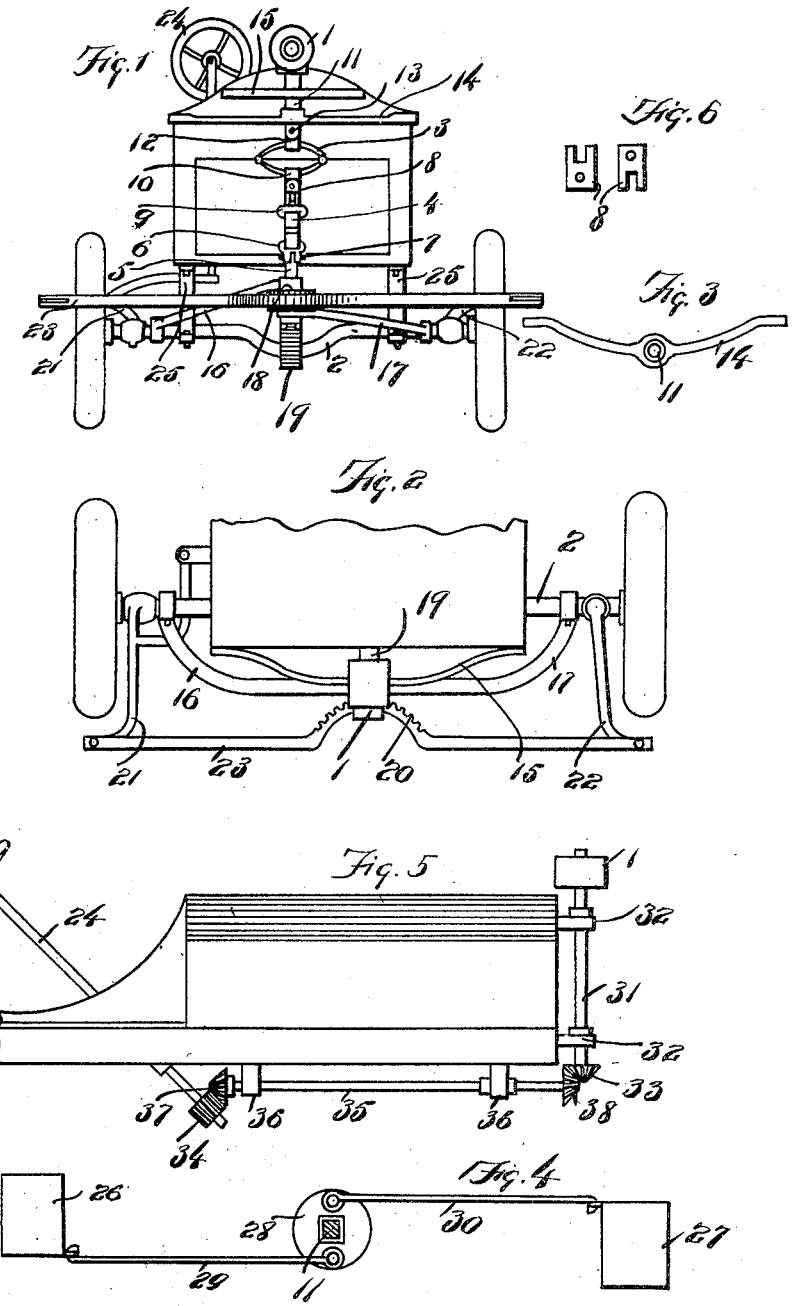

LEONARD M. LEACH, OF FORT WORTH, TEXAS.

HEADLIGHT-ADJUSTER FOR AUTOMOBILES.

No. 922,299.

Specification of Letters Patent.

Patented May 18, 1909.

Application filed January 18, 1909. Serial No. 472,779.

*To all whom it may concern:*

Be it known that I, LEONARD M. LEACH, a citizen of the United States, residing at Fort Worth, in the county of Tarrant and State of Texas, have invented certain new and useful Improvements in Headlight-Adjusters for Automobiles, of which the following is a specification.

My invention relates to head-lights for automobiles or other vehicles, and the object is to provide simple adjusting devices by which the head-lights will be automatically turned when the vehicle turns so that the light will be thrown in the direction in which the vehicle must go or will go. With head-lights, as now used, the light is thrown in a straight line for some time after the wheels of the automobiles have been turned in another direction.

The object of this invention is to provide simple adjusting devices which will turn the head-light of an automobile in the same direction as the wheels are turned and to turn the head-light simultaneously with the turning of the wheels.

Other objects and advantages will be fully explained in the following description, and the invention will be more particularly pointed out in the claims.

Reference is had to the accompanying drawings which form a part of this application and specification.

Figure 1 is a front elevation of a head-light provided with the adjusting devices attached to an automobile. Fig. 2 is a plan view of a portion of an automobile provided with a head-light. Fig. 3 is a plan view of a brace which is attached to the body of the automobile for guiding the movement of the mobile head-light support. Fig. 4 illustrates how the operating shaft may turn two head-lights instead of one head-light. Fig. 5 shows a head-light mounted on the automobile body instead of on the axle, as shown in Figs. 1 and 2, and shows the variation in the manner of operating the head-light. Fig. 6 shows the coupling which connects the two springs of the head-light shaft.

Similar characters of reference are used to indicate the same parts throughout the several views.

The head-light adjuster is applicable to any automobile of ordinary construction and may be mounted on the axle or on the body of the automobile and operatively connected with the steering wheel so that the adjuster will be adjusted whenever the steering wheel is operated to change the direction of the vehicle. Figs. 1 and 2 show adjuster mounted on the axle of the vehicle. The head-light 1 is mounted on the axle 2 by means of a flexible shaft, which is made flexible by two springs 3 and 4 and their couplings. The spring 4 is connected to the rod 5 by means of a coupling 6 which is rigid on the spring and which has a pivotal connection with the rod 5 by reason of the pivot bolt 7. The spring 3 is connected to the spring 4 by means of a coupling 8 which is pivotally connected with clevises 9 and 10, the clevises 9 and 10 being rigidly mounted on the springs 4 and 3 respectively. The spring 3 is connected with the rod 11 or shaft 11 by means of a coupling 12 which is rigidly mounted on the spring 3 and which is pivotally connected to the shaft 11 by a pivot bolt 13. The rod or shaft 11 is held in upright position by the braces 14 and 15. The shaft 5 is supported from the axle 2 by means of lateral braces 16 and 17, the brace 16 engaging the shaft 5 above a pinion 18 and the brace 17 engaging this shaft below the pinion 18. The shaft 5 is further supported by a brace 19 which engages the central part of the axle. The braces 16 and 17 and 19 are rigid with the axle and support the shaft 5 in operative position. The shaft of the head-light is thus supported on the axle and is made flexible so that it will move with the body as the body of the automobile rocks on its springs. The pinion 18 is actuated by a rack 20. The arms 21 and 22 are extended forwardly and outwardly and the ends thereof are pivotally connected with the ends of a bar 23. The arms 21 and 22 are the steering arms of an ordinary automobile extended so that the rack bar 23 will be far enough from the axle so that the rack 20 which is formed on the bar 23 will mesh with the pinion 18.

The steering arms 21 and 22 are operated by the usual hand-wheel 24. Whenever the steering mechanism is operated the shaft of the head-light will be rotated by the rack 20. It will be understood that the shaft 11 moves freely and vertically through the braces 14 and 15 as the automobile sways on its springs 25, consisting of a pinion mounted on said shaft and a rack bar curved to conform with the radial movement of said front axle relative to said shaft.

The same shaft may be used to turn two head-lights instead of one as above described. The head-lights 26 and 27 may be pivotally mounted. A yoke 28 has a square or rectangular aperture therethrough and a portion of the shaft 11 is made square in cross-section so that it will move vertically and freely through the yoke 28 which may be mounted on brace 14 or brace 15. The shaft 11 will thus continue to turn the yoke 28 at whatever height the shaft may move through the yoke. The head-lights 26 and 27 are connected to the yoke 28 by rods 29 and 30 which are pivotally connected to the yoke 28 and loosely connected with the head-lights.

Fig. 4 illustrates the manner of connecting the head-lights to the yoke, the rod 30 being connected to the rear part of the yoke and to the rear of the pivotal mounting of the head-light and the rod 29 being pivotally connected to the front part of the yoke 28 and loosely connected to the head-light 26 forward of the pivotal mounting. The shaft 11 will, with these connections, turn both head-lights at the same time. The head-light may also be mounted on the body of the automobile, as shown in Fig. 5. A shaft 31 is journaled on the front of the vehicle by means of bearings 32 and a head-light 1 mounted on the upper end of the shaft. A bevel gear wheel 33 is mounted on the lower end of the shaft 31. A bevel gear wheel 34 is mounted on the steering shaft 24. A shaft 35 is journaled in bearings 36 which are attached to the bottom of the vehicle body. This shaft 35 has a bevel gear wheel 37 which meshes with and is driven by the wheel 34 and this shaft is also provided with a bevel gear wheel 38 which meshes with and drives the wheel 33. In this manner the turning of the steering shaft may or will turn the head-light whenever the steering mechanism is used to change the direction of the vehicle.

Having fully described my invention, what I claim as new and desire to secure by Letters Patent, is,—

1. In a vehicle provided with a steering gear, a head-light, a vertically extensible shaft supporting said head-light, and gearing for rotating said shaft operatively connected with said shaft and said steering gear whereby said head-light is turned whenever said steering gear is operated.

2. In a vehicle provided with steering gear, a head-light, a flexible shaft supporting said head-light, a pinion mounted on said shaft and a rack bar operatively connected with said steering gear and meshing with said pinion whereby said head-light is turned whenever said steering gear is operated.

3. In a vehicle provided with steering gear, a head-light, a flexible shaft supporting said head-light, braces attached to the axle of the vehicle and supporting said shaft, a gear wheel mounted on said shaft and a rack bar operatively connected with said steering gear and meshing with said gear wheel whereby said head-light is turned whenever said steering gear is operated.

4. In a vehicle provided with a front axle and a rear axle steering gear, head-lights, a vertically disposed rotatable shaft operatively connected with said head-lights, and gearing for driving said shaft consisting of a pinion mounted on said shaft and a rack bar curved to conform with the radial movement of said front axle relative to said shaft.

5. In a vehicle provided with steering gear, head-lights, a vertically disposed rotatable and extensible shaft operatively connected with said head-lights, braces engaging said shaft loosely and attached to the body of said vehicle, braces attached to the axle of the vehicle and supporting said shaft, a pinion mounted on said shaft, and gearing for driving said pinion operatively connected with said steering gear.

6. In a vehicle provided with steering gear, head-lights, a vertically disposed rotatable shaft operatively connected with said head-lights, a pinion mounted on said shaft, said steering gear including a bar projected in front of the vehicle, and a rack formed on said bar and adapted to mesh with and operate said pinion.

In testimony whereof, I set my hand in the presence of two witnesses, this 12th day of January, 1909.

LEONARD M. LEACH.

Witnesses:
A. L. JACKSON,
J. W. STITT.